(12) United States Patent
Ashish et al.

(10) Patent No.: US 8,572,579 B2
(45) Date of Patent: Oct. 29, 2013

(54) BREAK ON NEXT CALLED FUNCTION OR METHOD IN JAVA DEBUGGER AGENT

(75) Inventors: Kumar Ashish, Bangalore (IN); Nataraju Neeluru, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 569 days.

(21) Appl. No.: 12/859,511

(22) Filed: Aug. 19, 2010

(65) Prior Publication Data
US 2012/0047493 A1 Feb. 23, 2012

(51) Int. Cl.
*G06F 9/44* (2006.01)

(52) U.S. Cl.
USPC ............. 717/129; 717/120; 717/5; 717/125; 717/148; 717/151

(58) Field of Classification Search
USPC .................. 717/129, 120, 5, 125, 148, 151
See application file for complete search history.

(56) References Cited

U.S. PATENT DOCUMENTS

| | | | |
|---|---|---|---|
| 6,298,477 B1 * | 10/2001 | Kessler | 717/145 |
| 6,463,578 B1 | 10/2002 | Johnson | |
| 6,637,024 B1 | 10/2003 | Johnson et al. | |
| 6,850,953 B1 | 2/2005 | Deshpande et al. | |
| 6,895,575 B2 | 5/2005 | Dharamshi | |
| 6,934,886 B2 | 8/2005 | Ok | |
| 6,966,057 B2 | 11/2005 | Lueh | |
| 6,986,124 B1 | 1/2006 | Field et al. | |
| 7,353,427 B2 * | 4/2008 | Bates et al. | 714/38.12 |
| 7,555,744 B2 | 6/2009 | Chkodrov et al. | |
| 7,908,590 B1 * | 3/2011 | Min et al. | 717/124 |
| 8,321,838 B2 * | 11/2012 | Alpern | 717/124 |
| 2004/0128655 A1 | 7/2004 | Bates et al. | |
| 2005/0216895 A1 | 9/2005 | Tran | |
| 2006/0064677 A1 * | 3/2006 | Bickson et al. | 717/124 |
| 2008/0115119 A1 | 5/2008 | Lagergren | |
| 2008/0141222 A1 * | 6/2008 | Alpern | 717/125 |
| 2008/0244547 A1 | 10/2008 | Wintergerst et al. | |

(Continued)

FOREIGN PATENT DOCUMENTS

| | | | |
|---|---|---|---|
| JP | 2039332 A | 2/1990 | |
| JP | 2135545 A | 5/1990 | |

(Continued)

OTHER PUBLICATIONS

U.S. Appl. No. 12/857,734, filed Aug. 17, 2010, Office Action mailed Aug. 31, 2012, 10 pages.

(Continued)

*Primary Examiner* — Vanel Frenel
(74) *Attorney, Agent, or Firm* — Kilpatrick Townsend & Stockton LLP

(57) ABSTRACT

Embodiments of the invention provide systems and methods for optimizing handling of breakpoints in a Java debugger agent. Embodiments provide a novel command that allows execution of the application in the debugger to stop or break at the beginning of a next called function or method (e.g., a "break on next called function" or "BNCF" command). When the BNCF command is given to the debugger, a flag may be set in the interpreter of the virtual machine to which the debugger is attached. On encountering a new method or function call, the flag is examined by the interpreter to determine whether it should stop or break in that call. If the flag is set, the interpreter will stop; otherwise the interpreter proceeds.

20 Claims, 7 Drawing Sheets

(56) References Cited

U.S. PATENT DOCUMENTS

| | | | |
|---|---|---|---|
| 2008/0244549 | A1 | 10/2008 | Kejariwal et al. |
| 2008/0250397 | A1 | 10/2008 | Dahms et al. |
| 2009/0037892 | A1 | 2/2009 | Luedde |
| 2012/0047486 | A1 | 2/2012 | Ashish et al. |

FOREIGN PATENT DOCUMENTS

| | | |
|---|---|---|
| JP | 4155540 A | 5/1992 |
| JP | 4348436 A | 12/1992 |
| JP | 6004346 A | 1/1994 |
| WO | WO 2006087922 A1 | 8/2006 |

OTHER PUBLICATIONS

A Short User Manual for dbx, http://www.cs.uiowa.edu/~rus/Courses/SysSoft/dbx.pdf, downloaded Dec. 7, 2010, pp. 1-3.
Breakpoint, http://info.krc.karelia.ru/java/docs/guide/jvmdi/jvmdi.html#SetBreakpoint, downloaded Nov. 29, 2010, pp. 1-49.
Continuing and Stepping—Debugging with DGB, http://sourceware.org/gdb/current/onlinedocs/gdb/Continuing-and-Stepping.html, downloaded Dec. 7, 2010, pp. 1-5.
EGL Debugger Commands, http://publib.boulder.ibm.com/infocenter/rbdhelp/v7r5m0/index.jsp?topic=/com.ibm.egl.pg.doc/topics/pegl_core_debug_commands_cpt.html, downloaded Dec. 7, 2010, pp. 1-407.
Gallardo, Debugging a Java Program with Eclipse, http://www.developer.com/article.php/2221711, Jun. 13, 2003, pp. 1-7.
Java Platform Debugger Architecture, http://java.sun.com/j2se/1.4.2/docs/guide/jpda/javadt.html, 2010, pp. 1-3.
JDebugTool, Graphical Java Debugger, http://www.debugtools.com/, downloaded Nov. 29, 2010, pp. 1-2.
JProbe Memory Debugger, http://www.tan.co.jp/JProbe/MemoryDebugger.aspx, 2010, pp. 1.
JSwat Java Debugger, http://code.google.com/p/jswat/, 2010, pp. 1-2.
Judd, Christopher, Debugging in JBuilder, http://www.juddsolutions.com/debug.html, 2002, pp. 1-7.
Oliver et al., Rhino JavaScript Debugger, http://www.mozilla.org/rhino/debugger.html, downloaded Dec. 7, 2010, pp. 1-4.
Python Software Foundation, The Python Debugger, http://docs.python.org/library/pdb.html, 1990-2010, pp. 1-8.
SunMicrosystems, Inc., JavaTM Virtual Machine Debug Interface Reference, http://info.krc.karelia.ru/java/docs/guide/jvmdi/jvmdi.html#SetBreakpoint, 1996-1998, pp. 1-59.
The MathWorks, Inc., Debugging: Programming Tips, http://www.mathworks.com/access/helpdesk/help/techdoc/matlab_prog/f10-60570.html, 1984-2010, pp. 1-3.
The Mathworks, Inc., Set Breakpoints—MATLAB, http://www.mathworks.com/access/helpdesk/help/techdoc/ref/dbstop.html, 1984-2010, pp. 1-5.
Winchester, Joe, IBM WebSphere Developer Technical Journal: Debugging Java code running inside WebSphere Application Server, http://www.ibm.com/developerworks/websphere/techjournal/0110_winchester/winchester.html#olt, Oct. 15, 2001, pp. 1-18.
U.S. Appl. No. 12/857,734, filed Aug. 17, 2010, Notice of Allowance mailed Feb. 21, 2013, 10 pages.
Feb. 21, 2013, Notice of Allowance.
Aug. 31, 2012, Non-Final Office Action.

* cited by examiner

BREAK ON NEXT CALLED FUNCTION OR METHOD IN JAVA DEBUGGER AGENT

BACKGROUND

Embodiments of the present invention relate generally to debugging agents, and, more particularly, to breakpoint handling in Java™ debugging agents.

When debugging a software application, it is often desirable to set breakpoints to cause a debugger agent to stop at a predefined location for debugging purposes. A common feature of many software applications is that those applications branch into multiple possible method or function calls depending on certain circumstances. For example, an application may select from a number of functions to execute according to the value of a certain variable at a certain point in the execution of the application. When the application branches, it may be cumbersome or otherwise undesirable to set a breakpoint at each possible branch of the application.

BRIEF SUMMARY

Among other things, systems and methods are described for optimizing handling of breakpoints in a Java™ debugger agent. Embodiments provide a novel command in a Java™ debugger agent that allows execution of the application in the debugger to stop or break at the beginning of a next called function or method. In one embodiment, a "break on next called function" (or "BNCF") command is issued by a user at a debugger front-end to a debugger agent at a debugger back-end prior to the debugger agent reaching a location where the application branches to one or more of multiple possible methods or functions. When the BNCF command is given to the debugger agent, a flag is set in the interpreter of the Java™ virtual machine to which the debugger is attached. On encountering a new method or function call, the flag is examined by the interpreter to determine whether it should stop or break in that call. If the flag is set, the interpreter will stop; otherwise the interpreter proceeds. For example, the call to a new method is detected by looking for one or more predefined opcodes (e.g., "invokevirtual," "invokespecial," "invokestatic," and "invokeinterface").

According to one set of embodiments, a method is provided for implementing breakpoints in a computer-implemented debugger environment having a front-end system and a back-end system. The method includes detecting a break on next called function (BNCF) command during execution of an application by a virtual machine running as part of the back-end system of the computer-implemented debugger environment; detecting an invoke command using the virtual machine during execution of the application and subsequent to detecting the BNCF command, the invoke command indicating invocation of a program method; and breaking execution of the application using the virtual machine upon invoking the method.

According to another set of embodiments, a method is provided for implementing breakpoints in a computer-implemented debugger environment having a front-end system and a back-end system. The method includes detecting an invoke command indicating invocation of a program method during execution of an application comprising the method using a virtual machine running as part of the back-end system of the computer-implemented debugger environment; determining whether a break on next called function (BNCF) flag was set during execution of the application by the virtual machine prior to detecting the invoke command; and when the BNCF flag was set during execution of the application by the virtual machine prior to detecting the invoke command, breaking execution of the application by the virtual machine upon invoking the program method.

According to yet another set of embodiments, a computer-implemented debugging system is provided. The computer-implemented debugging system includes a back-end subsystem configured to run a virtual machine. The virtual machine is configured to: execute an application comprising a number of program methods; detect an invoke command indicating invocation of one of the program methods during execution of the application; determine whether a break on next called function (BNCF) flag was set during execution of the application prior to detecting the invoke command; and break execution of the application upon invoking the one of the program methods when the BNCF flag was set during execution of the application by the virtual machine prior to detecting the invoke command.

DETAILED DESCRIPTION

Figure 1:
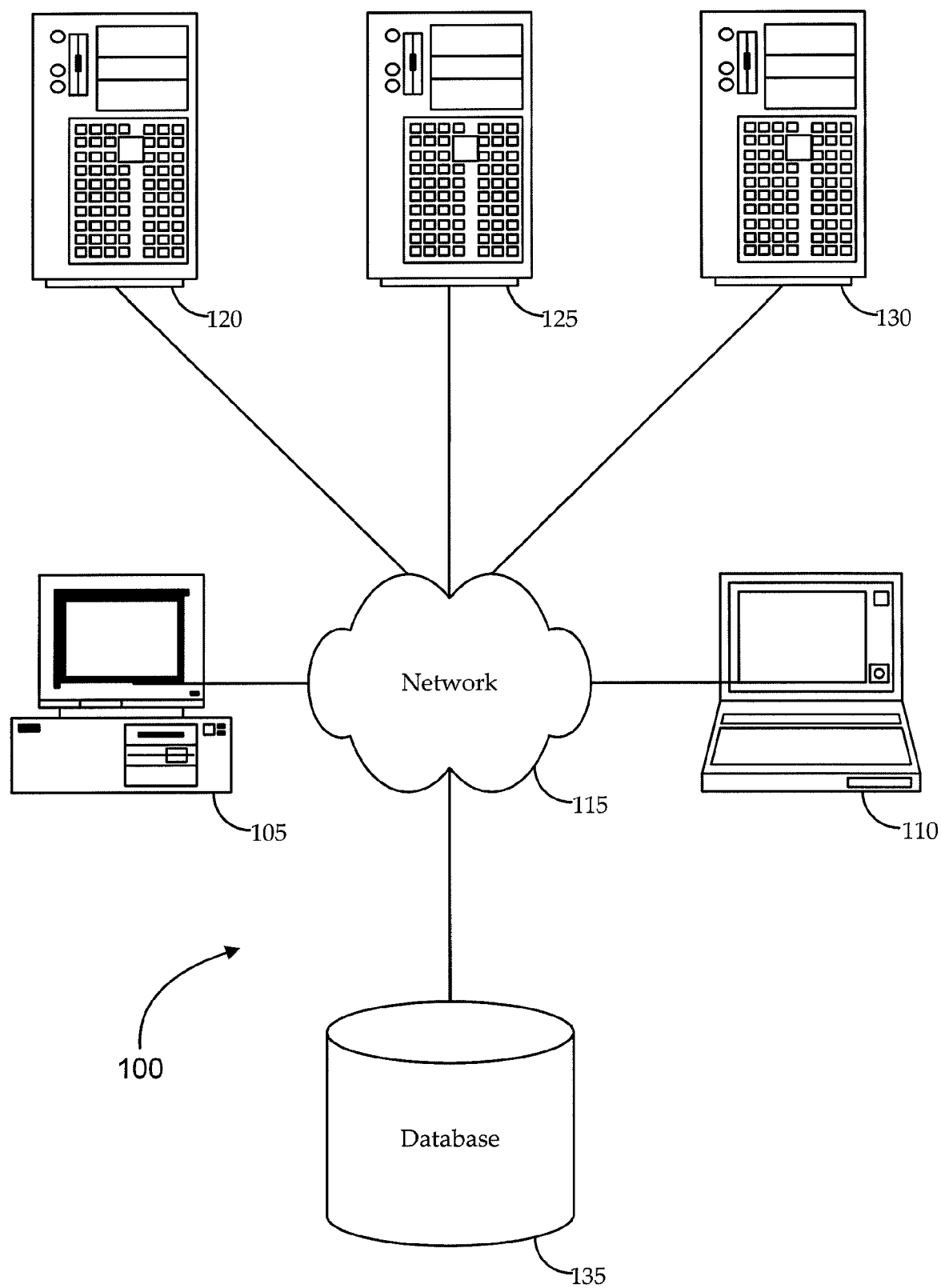
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Some embodiments are described herein for optimizing handling of breakpoints in a Java™ debugger agent. Embodiments provide a novel command in a Java™ debugger agent that allows execution of the application in the debugger to stop or break at the beginning of a next called function or method. A "break on next called function" (or "BNCF") command is given to a debugger agent, for example, by a user at a debugger front-end via a user interface. When the BNCF command is given to the debugger, a flag is set in the interpreter of the Java™ virtual machine to which the debugger is attached. On encountering a new method or function call, the flag is examined by the interpreter to determine whether it should stop or break in that call. If the flag is set, the interpreter will stop; otherwise the interpreter proceeds. For example, the call to a new method is detected by looking for one or more predefined opcodes (e.g., "invokevirtual," "invokespecial," "invokestatic," and "invokeinterface").

Turning first to FIG. 1, a block diagram illustrating components of an exemplary operating environment is shown, in which various embodiments of the present invention may be implemented according to various embodiments. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems).

These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO, etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, an application server, etc. Such servers may be used to process requests from user computers 105, 110. The applications can also include any number of applications for controlling access to resources of the server computers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 120, 125, 130. Alternatively, it may be remote from any or all of the computers 105, 110, 120, 125, 130, and/or in communication (e.g., via the network 115) with one or more of these. In a particular set of embodiments, the database 135 may reside in a storage-area network (SAN) familiar to those skilled in the art. Similarly, any necessary files for performing the functions attributed to the computers 105, 110, 120, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
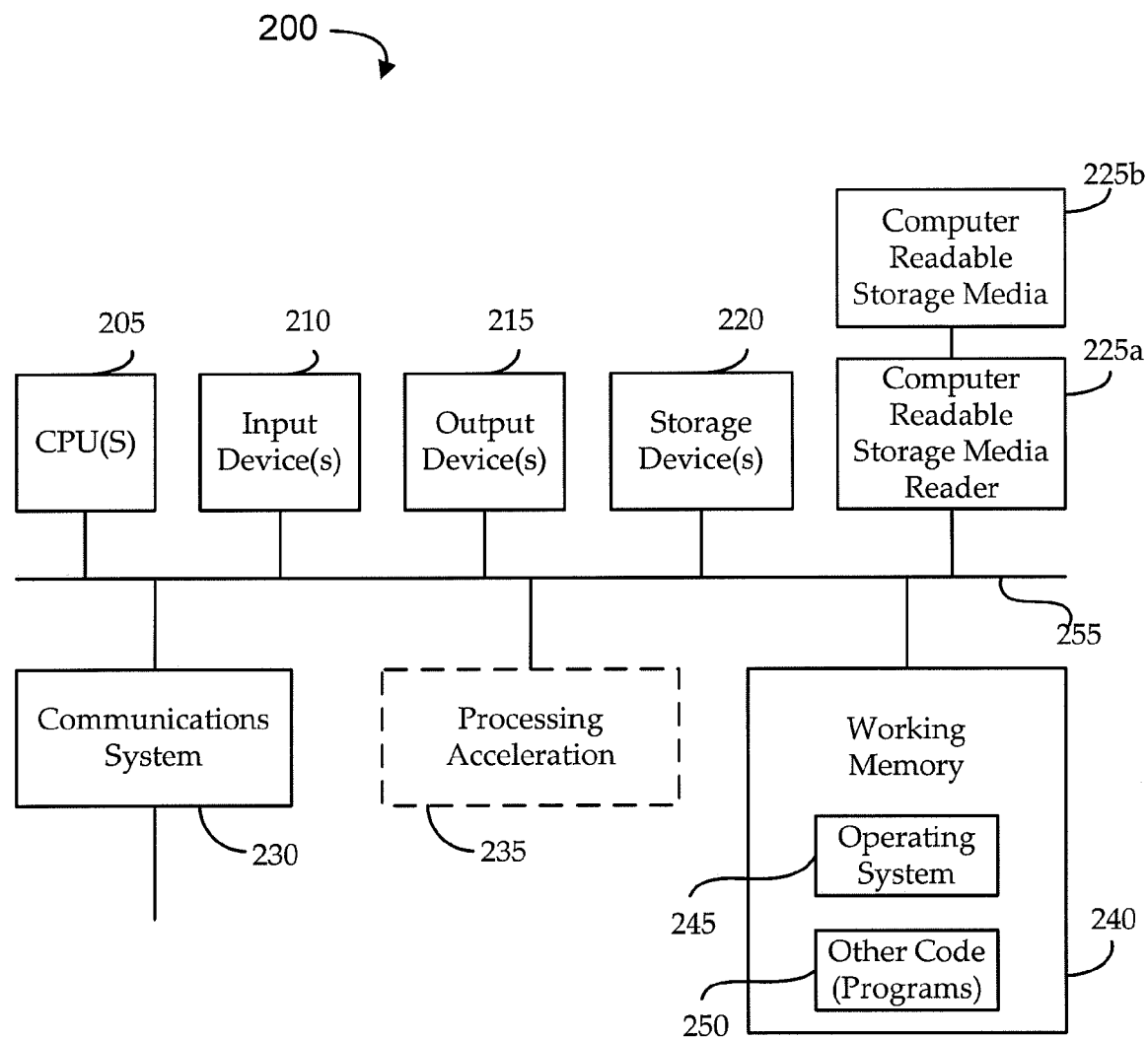
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device(s) 220. By way of example, storage device(s) 220 may be disk drives, optical storage devices, a solid-state storage device such as a random access memory (RAM), and/or a read-only memory (ROM), which can be programmable, flash-updateable, and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor, and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 115 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
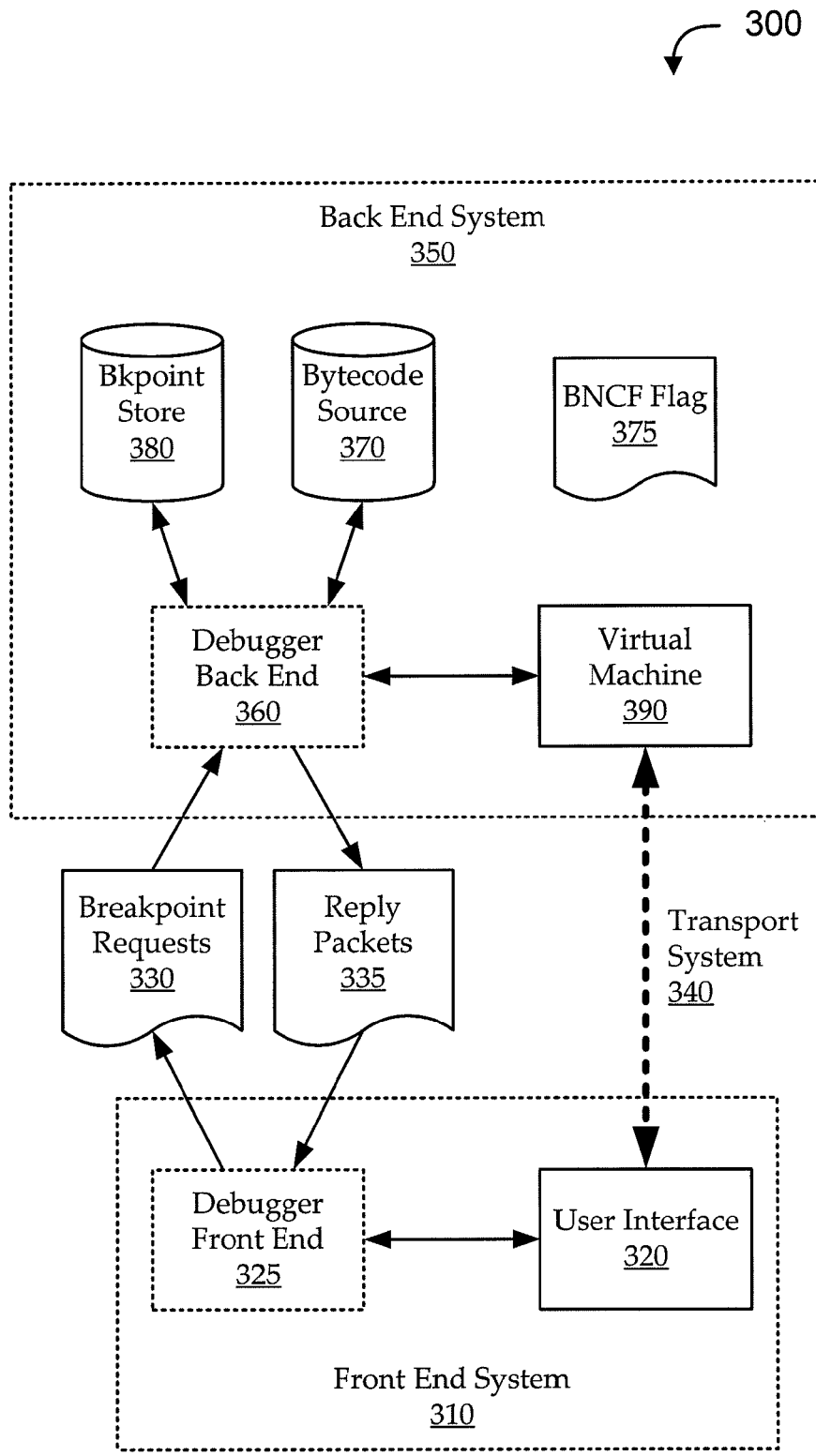
FIG. 3 shows a block diagram of an illustrative debugging environment, according to various embodiments.

FIG. 3 shows a block diagram of an illustrative debugging environment 300, according to various embodiments. The debugging environment 300 includes a front-end system 310 and a back-end system 350, in communication over a transport system 340. As illustrated, the front-end system 310 may include a user interface 320 and a debugger front-end 325. The back-end system 350 may include a virtual machine 390, a debugger back-end 360, and a number of data stores, including a bytecode source 370 and a breakpoint store 380.

Embodiments of the debugging environment 300 are used for debugging a software application. The debugging environment 300 is described herein as a Java™ debugger for debugging Java™ bytecode. It will be appreciated that the novel functionality described herein may not be limited to Java™ environments; rather, other similar programming and/or debugging environments may be used without departing from the scope of the invention.

When debugging a software application (e.g., application, applet, function, etc.), it is often desirable to set breakpoints. The breakpoints may cause the debugger back-end 360 (e.g., debugger agent) to stop at a predefined location for debugging purposes. For example, it may be desirable for a programmer to see the value of variables at a particular point in a program where they would not normally be displayed to the user to determine whether a particular portion of the code (e.g., function) is operating as intended.

In many typical Java™ debuggers, a breakpoint may be requested (e.g., illustrated as breakpoint requests 330) by a programmer. Upon receiving a breakpoint request 330, the debugger back-end 360 assigns a request identifier and associates certain relevant information about the breakpoint request 330 in a data structure, illustrated as the breakpoint store 380. For example, when the breakpoint request 330 is received, the debugger back-end 360 may store location information, including a class identifier, a method identifier, a method offset, etc., and associate the request identifier to the location information in the breakpoint store 380.

The debugger back-end 360 may have access to the program code as the bytecode source 370 (e.g., the original or a copy of the original bytecode). When the debugger back-end 360 runs the bytecode source 370 for debugging, one or more copies of the program bytecode may be made, in which the source bytecode at each breakpoint request 330 location is replaced by a special breakpoint opcode. The debugger back-end 360 may then run the modified bytecode from the modified bytecode copy, rather than running the original bytecode, which may be stored in a location that is the same as or different from the location of the bytecode source 370. The breakpoint opcode in the modified bytecode copy may be used by the debugger back-end 360 to detect the breakpoint and to inform the debugger front-end 325 (e.g., and thereby inform the breakpoint requester) that the breakpoint has been reached.

For example, a Java Virtual Machine (JVM) (e.g., virtual machine 390) in the back-end system 350 may inform the debugger front-end 325 that a breakpoint associated with a particular breakpoint request 330 identifier has been reached. Typically, when the breakpoint opcode is reached by the debugger back-end 360 (e.g., using the virtual machine 390), the debugger back-end 360 calls the function associated with the breakpoint opcode and supplies the function with the current program counter. The function (e.g., and/or other functions) and the program counter may be used to generate a thread identifier and/or other location information. The location information may then be used to search through the breakpoint store 380 data structure to find the associated request identifier.

Once the appropriate request identifier has been located, a reply packet 335 may be generated for passing desired information to the requestor (e.g., the programmer) at the debugger front-end 325. The reply packet 335 may include the request identifier, the thread identifier, and the associated location information. For example, receipt of the reply packet 335 at the debugger front-end 325 may cause relevant information for the breakpoint request 330 (e.g., current values of local variables) to be displayed to the debugger front-end 325 (e.g., to a debugger user interface).

Notably, at certain portions of the program, bytecode may cause the program to branch according to one or more conditions. For example, at a particular location, a value of a variable or some other condition may cause the program to select between multiple execution paths. These multiple execution paths may be implemented as various methods (e.g., functions) which may be called according to the variable value or other condition.

According to one approach, a breakpoint request 330 is set at a location just prior to the branching. While this approach may allow only a single breakpoint request 330 to be set, it will be appreciated that the corresponding reply packet 335 may not reflect any information about the branching, as the branching has yet to occur. According to another approach, breakpoint requests 330 are set at the beginning of each possible method resulting from the branching, so as to ensure that any branching result will cause a break and will be reflected in a corresponding reply packet 335. While this approach may yield more information about the branching result, it may also require a number of breakpoint requests 330 to be set at multiple locations. This may be cumbersome and may cause other undesirable results, as explained more fully below.

Embodiments provide additional functionality to the debugger back-end 360 (e.g., to the virtual machine 390) by implementing a "break on next called function" (or "BNCF") command that affects a BNCF flag 375. The BNCF command allows execution of the application in the debugger to stop or break at the beginning of a next called function or method. The BNCF command may be issued at the debugger front-end 325 (e.g., by a user through the user interface 320) and passed to the debugger back-end 360. The BNCF command may typically be issued to the debugger back-end 360 prior to encountering a location where the application branches to one or more of multiple possible methods or functions.

When the BNCF command is given to the debugger back-end 360, the BNCF flag 375 is set in the interpreter of the virtual machine 390. For example, the BNCF flag 375 is "OFF" or "0" by default and is set to "ON" or "1" when the BNCF command is received at the debugger back-end 360.

On encountering a new (e.g., next) method or function call, the BNCF flag 375 is examined by the virtual machine 390 to determine whether it should stop or break in that call. If the BNCF flag 375 is set, the virtual machine 390 will stop; otherwise the virtual machine 390 proceeds.

In a typical Java™ environment (e.g., in the context of a Java™ virtual machine 390), a call to a new method may be detected by looking for one or more of the following predefined opcodes: "invokevirtual," "invokespecial," "invokestatic," and "invokeinterface." Instance methods and/or static (or class) methods are invoked using these commands, regardless of whether the methods are native methods or Java™ methods. For example, class methods may be invoked by the virtual machine 390 according to a type of object reference known at the time of compiling, while instance methods may be invoked by the virtual machine 390 according to an actual object class, which may be known only at runtime. The "invokevirtual" command may typically be used to invoke instance methods, while the "invokestatic" command may be used to invoke static methods.

In some circumstances, instance methods are invoked using the "invokespecial" or "invokeinterface" commands. For example, the "invokespecial" command may be used when the method is invoked according to a reference type, instead of according to an object class, where static binding is preferable over dynamic binding (e.g., for instance initialization ("<init>") methods, private methods, super keyword methods, etc.). The "invokeinterface" command may be used when the instance method is invoked according to a reference having an interface type.

It will be appreciated that certain features of particular debugger environments may yield different features and/or limitations. For example, in the context of a typical Java™ virtual machine 390, programs are dynamically linked, such that method references are initially symbolic. As such, invoke commands refer to a constant pool entry initially containing a symbolic reference that identifies the method according at least to a class name, a method name, and a method descriptor. The virtual machine 390 resolves these symbolic references into direct references upon encountering an invoke instruction (e.g., the first time a method is invoked). The virtual machine 390 may also verify certain aspects of the program during resolution of the references, for example, to check for non-existent method references, improper syntax, improper authorization (e.g., to access private methods, etc.). When resolved and verified, the virtual machine 390 may invoke the method.

As described above, execution of an application (e.g., or a method of an application) may be stopped upon encountering a breakpoint opcode (corresponding to a breakpoint request 330). Alternatively or additionally, the virtual machine 390 can be configured so that, whenever method invocation is encountered, the BNCF flag 375 is checked to determine whether it is set. If the BNCF flag 375 is set, a break may occur at the beginning of that next-invoked method (e.g., function, etc.). Some illustrative embodiments of application flows are illustrated in FIGS. 4A-4D to further clarify certain aspects.

Figure 4A:
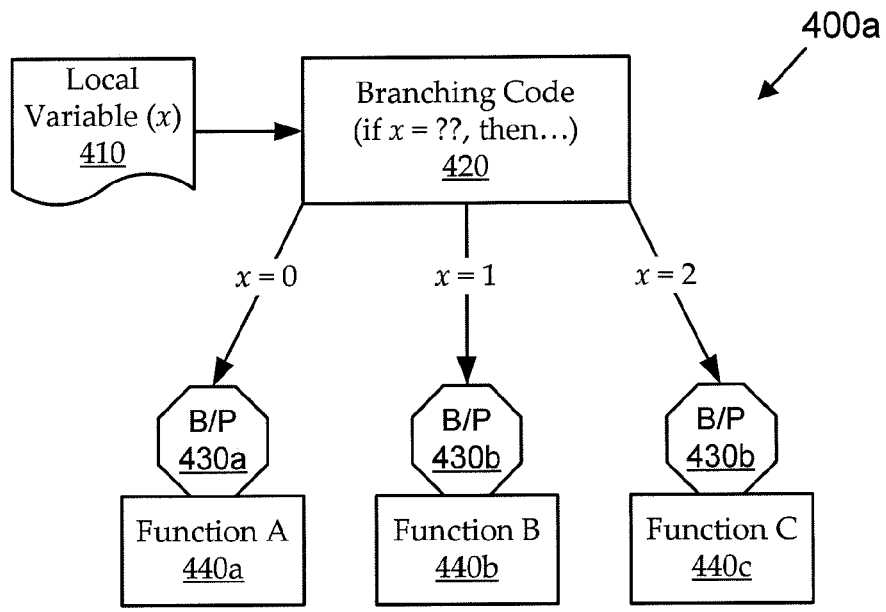
FIG. 4A shows an application flow using an illustrative prior art approach for debugging a branching portion of a program using breakpoints.

FIG. 4A shows an application flow 400a using an illustrative prior art approach for debugging a branching portion of a program using breakpoints. A local variable "x" 410 is passed to a branching code 420 portion of the program bytecode. For example, the branching code 420 invokes one of three methods according to the value of local variable "x" 410, as represented by the following pseudo-code:

```
foo( int x)
{
    if( x == 0 )
        f1();
    else if( x == 1)
        f2();
    else
        f3();
}
```

According to this pseudo-code, local variable "x" 410 is evaluated, and one of three functions ("f1," "f2," or "f3") is called according to the value of local variable "x" 410. In particular, if local variable "x" 410 equals zero, a first function, "f1" 440a, is invoked. If local variable "x" 410 equals one, a second function, "f2" 440b, is invoked. If local variable "x" 410 has any other value (e.g., if local variable "x" 410 equals two), a third function, "f3" 440c, is invoked.

Suppose it is desirable to analyze certain conditions (e.g., the values of certain variables) at the start of whichever function 440 is called by the branching code 420. As illustrated, a prior art approach may include putting a breakpoint 430 at the start of each function 440. For example, a first breakpoint 430a opcode is placed at the beginning of the bytecode for "f1" 440a. If local variable "x" 410 equals one, the branching code 420 may invoke "f1" 440a, thereby breaking according to breakpoint 430a. Notably, three breakpoints 430 may be needed to account for all the possible invocations of the branching code 420.

Figure 4B:
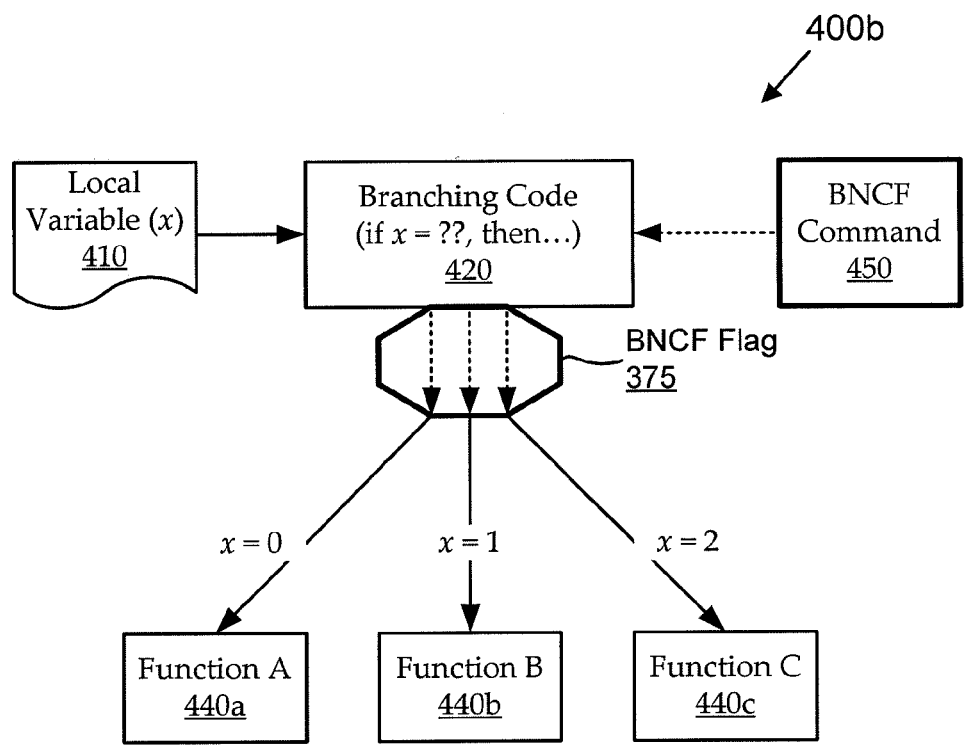
FIG. 4B shows an application flow for debugging a branching portion of a program using BNCF functionality, according to various embodiments.

FIG. 4B shows an application flow 400b for debugging a branching portion of a program using BNCF functionality, according to various embodiments. As in FIG. 4A, a local variable "x" 410 is passed to a branching code 420 portion of the program bytecode, which invokes one of three methods according to the value of local variable "x" 410. Instead of placing a breakpoint at the beginning of each potentially invoked function 440 (e.g., as indicated by breakpoints 430 in FIG. 4A), a BNCF command 450 is issued (e.g., prior to encountering the branching code 420) to the virtual machine 390. For example, the BNCF command 450 is given to the virtual machine 390 prior to the virtual machine 390 implementing any branching according to the branching code 420, thereby setting the BNCF flag 375.

When the virtual machine 390 encounters the BNCF flag 375, it determines whether the BNCF flag 375 is set; if so, the virtual machine 390 breaks execution at the beginning of any next-called method (e.g., upon detection of any of the invoke commands described above). It is worth noting that only a single BNCF command 450 is needed, rather than inserting multiple breakpoints 430 (e.g., as in FIG. 4A). It is further worth noting that any branching may be covered by the single BNCF command 450, such that no invocations of methods will be missed by failing to place breakpoints 330 at those methods.

Figure 4C:
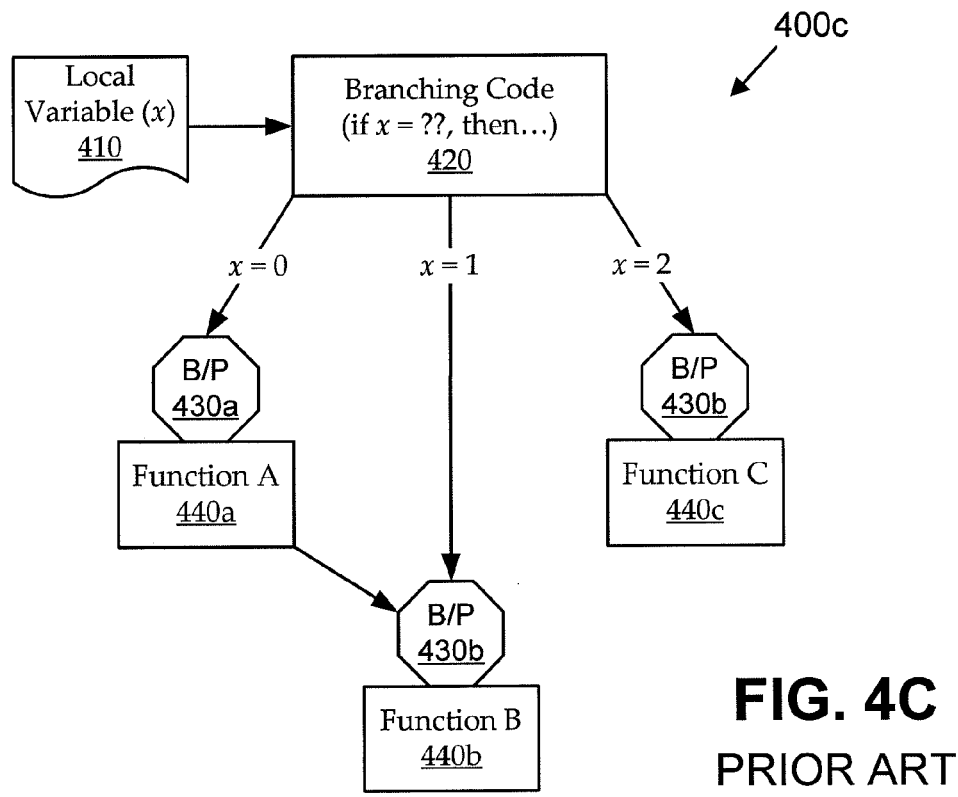
FIG. 4C shows another application flow using an illustrative prior art approach for debugging a branching portion of a program using breakpoints.

The application flows 400 of FIGS. 4A and 4B show a very simple case of a single branching event based on a single variable using simple function invocation, etc. The BNCF command 450 may yield further functionality with more complex application flows 400. For example, FIG. 4C shows another application flow 400c using an illustrative prior art approach for debugging a branching portion of a program using breakpoints.

As in FIG. 4A, a local variable "x" 410 is passed to a branching code 420 portion of the program bytecode, which invokes one of three methods according to the value of local variable "x" 410. Also as in FIG. 4A, breakpoints 430 have been set at the beginning of each function 440 that may be invoked by the branching code 420. Unlike in FIG. 4A, the application flow 400c of FIG. 4C includes a further invocation of method "f2" 440b at the end of method "f1" 440a. Because the breakpoint 430b is set at the beginning of "f2" 440b, this breakpoint may be encountered by the virtual machine 390 when "f2" 440b is invoked by the branching code 420 or by "f1" 440a. This may be undesirable, as this result may cause execution of the program to break at an undesirable location (e.g., immediately following execution of "f1" 440a, instead of immediately following execution of the branching code 420), or the result may make it more difficult for a user to distinguish the cause of execution of "f2" 440b (e.g., whether "f2" 440b was executed by "f1" 440a or by the branching code 420).

Figure 4D:
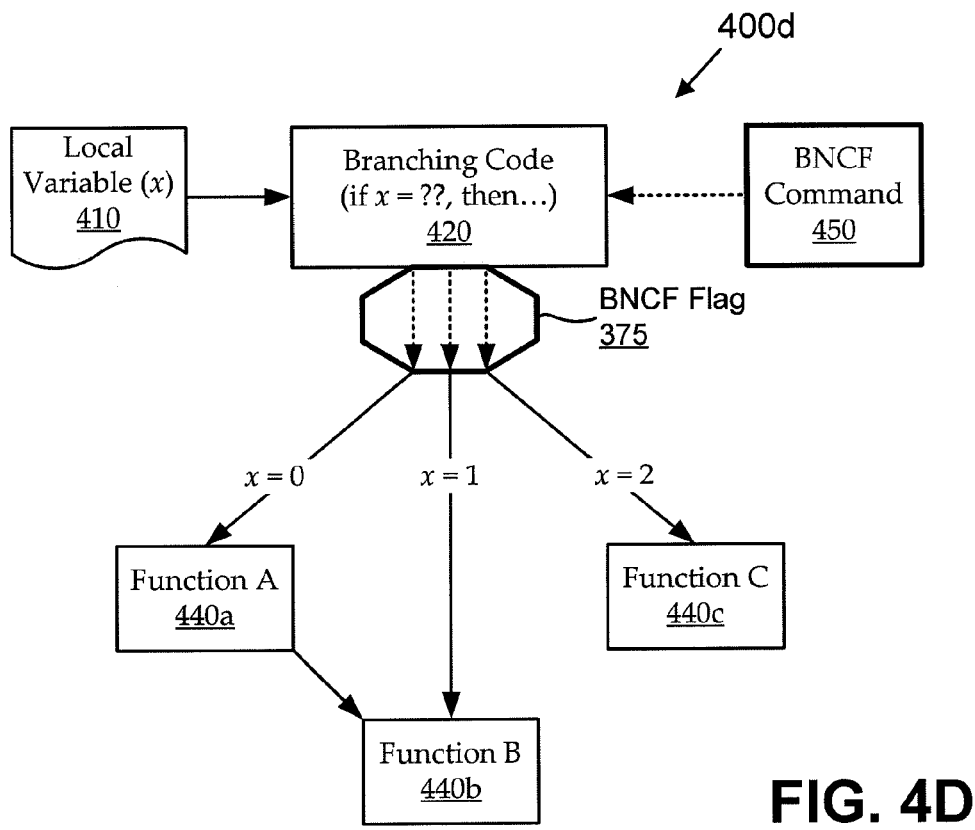
FIG. 4D shows an application flow for debugging a branching portion of a program using BNCF functionality, according to various embodiments.

FIG. 4D shows an application flow 400d for debugging a branching portion of a program using BNCF functionality, according to various embodiments. As in FIG. 4C, a local variable "x" 410 is passed to a branching code 420 portion of the program bytecode, which invokes one of three methods according to the value of local variable "x" 410. Instead of placing a breakpoint at the beginning of each potentially invoked function 440 (e.g., as indicated by breakpoints 430 in FIG. 4C), a single BNCF command 450 is issued prior to encountering the branching code 420. A BNCF flag 375 is set according to the BNCF command 450.

As in FIG. 4B, when the virtual machine 390 encounters the BNCF command 450, it analyzes the BNCF flag 375 and determines that the BNCF flag 375 is set. Accordingly, the virtual machine 390 breaks execution at the beginning of any next-called method (e.g., upon detection of any of the invoke commands described above). Notably, unlike in FIG. 4C, execution of the program may break only where desired, only following execution of the branching code 420 (i.e., there is no breakpoint at the beginning of "f2" 440b, so no breakpoint will be encountered immediately following execution of "f1" 440a). Further, unlike in FIG. 4C, use of the BNCF command 450 (e.g., with or without use of additional breakpoints) may allow a user to distinguish the cause of execution of "f2" 440b. For example, a reply packet 335 corresponding to the BNCF command 450 may only be returned to the debugger front-end 325 when "f2" 440b is invoked by the branching code 420, and not when invoked by "f1" 440a.

Figure 5:
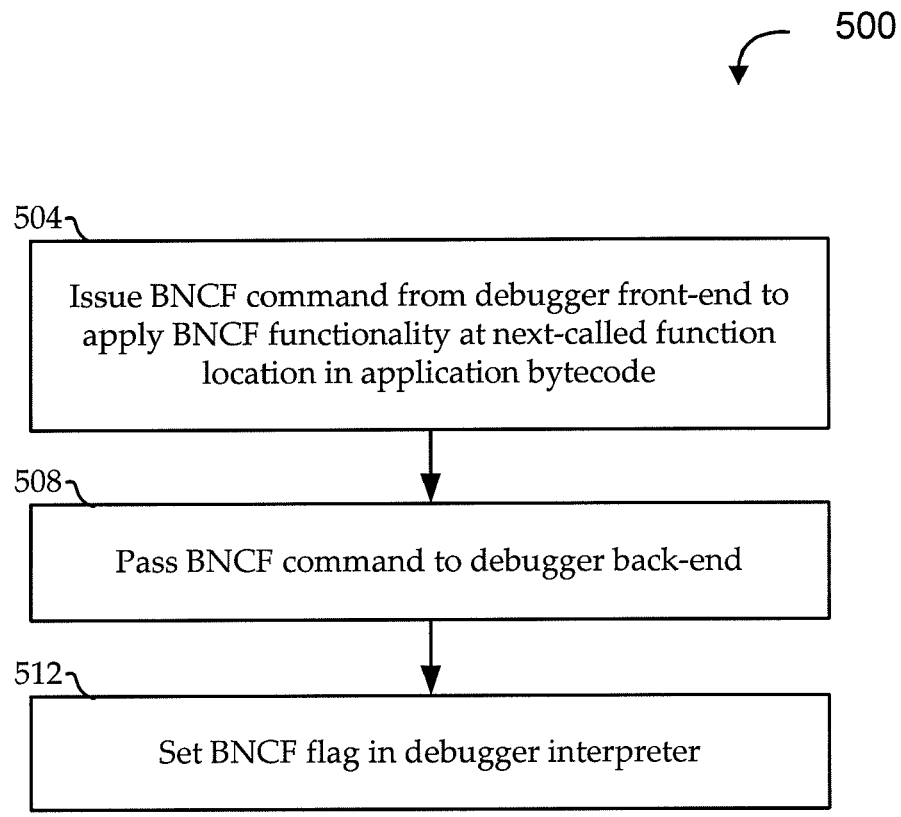
FIG. 5 shows a flow diagram of an illustrative method for providing a BNCF command to a debugger environment, according to various embodiments.

Turning to FIG. 5, a flow diagram is shown of an illustrative method 500 for providing a BNCF command to a debugger environment, according to various embodiments. In some embodiments, the method 500 is executed in a system like the debugger environment 300 of FIG. 3. Embodiments of the method 500 begin at block 504 by issuing a BNCF command from the debugger front-end (e.g., while the debugger agent is executing at a location in the application). For example, a user issues a BNCF command 450 prior to a particular set of branching code in the application via the user interface 320 of a debugger front-end 325.

At block 508, the BNCF command is passed to the debugger back-end. For example, the BNCF command 450 is communicated via the transport system 340 from the debugger front-end 325 to the debugger back-end 360. At block 512, according to the BNCF command, the debugger back-end may set a BNCF flag for use by the debugger agent. For example, the debugger back-end 360 sets the BNCF flag 375 to "ON" for use by the virtual machine 290.

Figure 6:
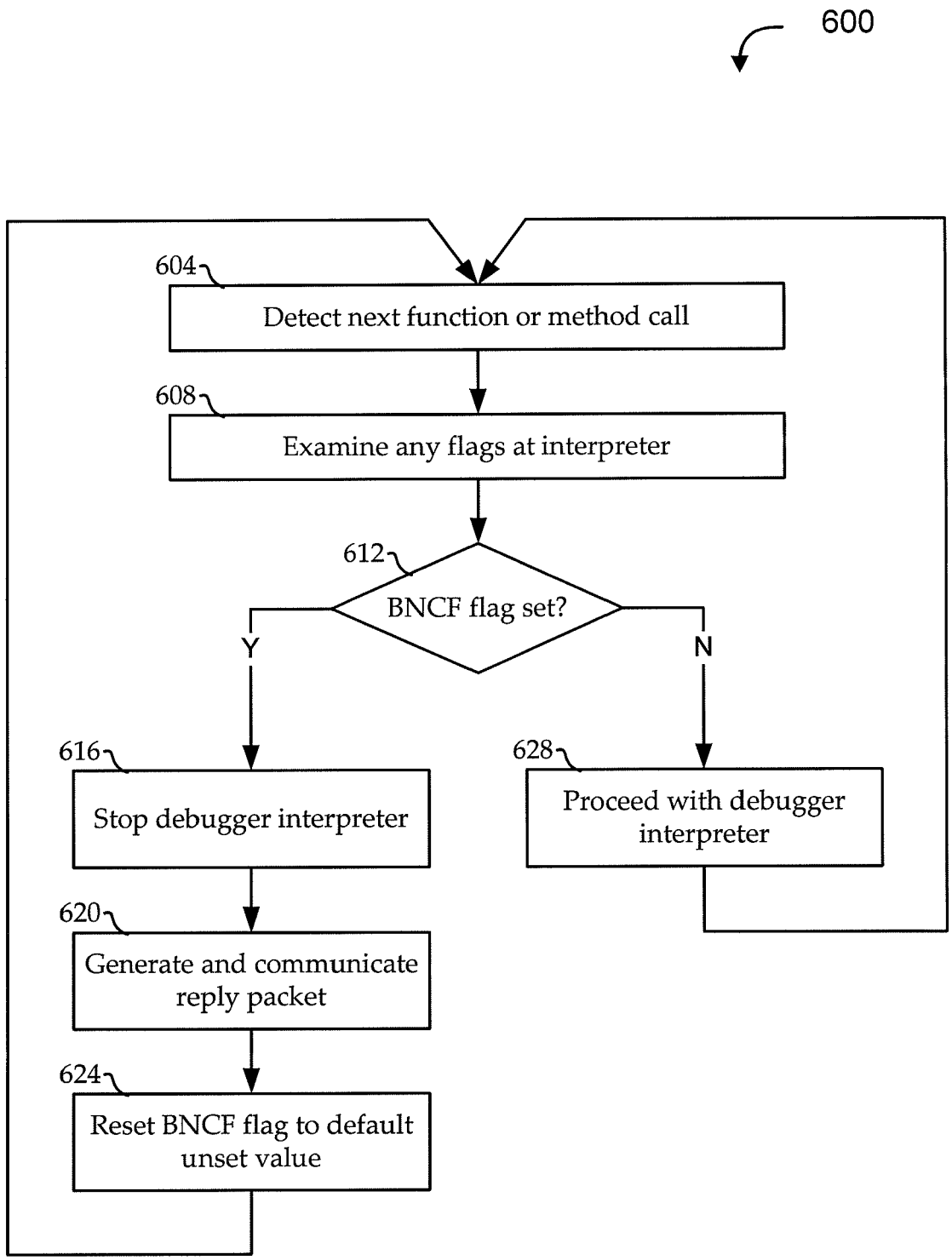
FIG. 6 shows a flow diagram of an illustrative method for interpreting a BNCF command in a debugger environment, according to various embodiments.

Having given the BNCF command 450 to the debugger back-end 360, the BNCF command 450 may effectively be used by the virtual machine 390 as requested, for example, according to the BNCF flag 375. FIG. 6 shows a flow diagram of an illustrative method 600 for interpreting a BNCF command in a debugger environment, according to various embodiments. In some embodiments, the method 600 is executed in a system like the debugger environment 300 of FIG. 3.

Embodiments of the method 600 begin at block 604 by detecting a next function or method call. For example, a Java™ debugger agent may detect one of the four invoke commands discussed above. Embodiments of the interpreter are configured so that, having detected the next method or function call, the virtual machine 390 may examine any flags at block 608. At block 612, a determination is made as to whether any BNCF flags have been set, for example, according to the method 500 of FIG. 5.

If it is determined at block 612 that a BNCF flag has been set, the virtual machine 390 may stop execution of the program at block 616. In some embodiments, at block 620, a corresponding reply packet 335 is generated and communicated to the debugger front-end 325 (e.g., via the transport system 340). Further, in some embodiments, the BNCF flag is reset to its default ("unset") value at block 624. If it is determined at block 612 that a BNCF flag has not been set, the virtual machine 390 may proceed with normal execution of the program at block 628.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for implementing breakpoints in a computer-implemented debugger environment having a front-end system and a back-end system, the method comprising:
   detecting, by a computer system, a break on next called function (BNCF) command during execution of an application by a virtual machine running as part of the back-end system of the computer-implemented debugger environment;
   setting, by the computer system, a BNCF flag using the virtual machine upon detecting the BNCF command;
   detecting, by the computer system, an invoke command using the virtual machine during execution of the application and subsequent to detecting the BNCF command and the BNCF flag being set, the invoke command indicating invocation of a program method; and
   breaking, by the computer system, execution of the application using the virtual machine upon invoking the method and the BNCF flag being set.

2. The method of claim 1,
   wherein the breaking execution of the application using the virtual machine upon invoking the program method step is performed only when the BNCF flag is set.

3. The method of claim 2, further comprising:
   unsetting the BNCF flag using the virtual machine subsequent to breaking execution of the application.

4. The method of claim 3, wherein unsetting the BNCF flag comprises setting the BNCF flag to a default condition.

5. The method of claim 1, further comprising:
   communicating a reply packet to the front-end system of the computer-implemented debugger environment subsequent to the breaking execution of the application step, the reply packet corresponding to the detected BNCF command.

6. The method of claim 1, further comprising:
   receiving the BNCF command at the back-end system from a user interface of the front-end system.

7. The method of claim 1, wherein the virtual machine is implemented as a Java virtual machine.

8. A method for implementing breakpoints in a computer-implemented debugger environment having a front-end system and a back-end system, the method comprising:
   detecting, by a computer system, an invoke command indicating invocation of a program method during execution of an application comprising the method using a virtual machine running as part of the back-end system of the computer-implemented debugger environment;
   determining, by the computer system, whether a break on next called function (BNCF) flag was set during execution of the application by the virtual machine prior to detecting the invoke command; and
   when the BNCF flag was set during execution of the application by the virtual machine prior to detecting the invoke command, breaking, by the computer system, execution of the application by the virtual machine upon invoking the program method.

9. The method of claim 8, further comprising:
   when the BNCF flag was not set during execution of the application by the virtual machine prior to detecting the invoke command, proceeding with execution of the application by the virtual machine including invoking and executing the program method.

10. The method of claim 8, further comprising:
    receiving a BNCF command during execution of the application by the virtual machine prior to detecting the invoke command; and
    setting the BNCF flag according to receiving the BNCF command.

11. The method of claim 8, further comprising:
    communicating a reply packet to the front-end system of the computer-implemented debugger environment subsequent to the breaking execution of the application step.

12. The method of claim 8, further comprising:
    unsetting the BNCF flag using the virtual machine subsequent to breaking execution of the application.

13. A computer-implemented debugging system comprising:
    a back-end computer subsystem configured to run a virtual machine, the virtual machine being configured to:
        execute an application comprising a plurality of program methods;
        detect an invoke command indicating invocation of one of the program methods during execution of the application;

determine whether a break on next called function (BNCF) flag was set during execution of the application prior to detecting the invoke command; and break execution of the application upon invoking the one of the program methods when the BNCF flag was set during execution of the application by the virtual machine prior to detecting the invoke command.

14. The computer-implemented debugging system of claim 13, wherein the virtual machine is further configured to:

proceed with execution of the application, including invoking and executing the one of the program methods, when the BNCF flag was not set during execution of the application by the virtual machine prior to detecting the invoke command.

15. The computer-implemented debugging system of claim 13, wherein the virtual machine is further configured to:

receive a BNCF command during execution of the application by the virtual machine prior to detecting the invoke command; and set the BNCF flag according to receiving the BNCF command.

16. The computer-implemented debugging system of claim 15, further comprising:

a front-end subsystem, communicatively coupled with the back-end subsystem, and configured to communicate the BNCF command to the back-end system via a user interface.

17. The computer-implemented debugging system of claim 13, wherein the virtual machine is further configured to:

unset the BNCF flag subsequent to breaking execution of the application.

18. The computer-implemented debugging system of claim 13, further comprising:

a front-end subsystem, communicatively coupled with the back-end subsystem, and configured to receive a reply packet from the back-end subsystem subsequent to the virtual machine breaking execution of the application.

19. The computer-implemented debugging system of claim 13, wherein the invoke command is part of a branching code of the application configured to select from at least two of the plurality of program methods to invoke according to a program condition determined upon encountering the branching code during execution of the application.

20. The computer-implemented debugging system of claim 13, further comprising:

a machine-readable medium having stored thereon a series of instructions which, when executed by a processor, cause the processor to direct operation of the back-end subsystem.

* * * * *

UNITED STATES PATENT AND TRADEMARK OFFICE
CERTIFICATE OF CORRECTION

| | | |
|---|---|---|
| PATENT NO. | : 8,572,579 B2 | Page 1 of 1 |
| APPLICATION NO. | : 12/859511 | |
| DATED | : October 29, 2013 | |
| INVENTOR(S) | : Ashish et al. | |

It is certified that error appears in the above-identified patent and that said Letters Patent is hereby corrected as shown below:

In the Specification

In column 4, line 25, delete "may can" and insert -- can --, therefor.

Signed and Sealed this
Third Day of June, 2014

Michelle K. Lee
*Deputy Director of the United States Patent and Trademark Office*